(12) United States Patent
White

(10) Patent No.: US 7,841,603 B2
(45) Date of Patent: Nov. 30, 2010

(54) HAND TRUCK

(76) Inventor: Anthony Renfrew White, PO Box 1290, Springwood, Queensland, 4127 (AU)

( * ) Notice: Subject to any disclaimer, the term of this patent is extended or adjusted under 35 U.S.C. 154(b) by 959 days.

(21) Appl. No.: 10/586,066

(22) PCT Filed: Jan. 13, 2005

(86) PCT No.: PCT/AU2005/000028
§ 371 (c)(1),
(2), (4) Date: Jul. 14, 2006

(87) PCT Pub. No.: WO2005/068273
PCT Pub. Date: Jul. 28, 2005

(65) Prior Publication Data
US 2007/0152413 A1 Jul. 5, 2007

(30) Foreign Application Priority Data
Jan. 16, 2004 (AU) ............................. 2004900194

(51) Int. Cl.
*B62B 1/04* (2006.01)
(52) U.S. Cl. ...................... 280/47.29; 280/5.2; 280/659
(58) Field of Classification Search .................. 280/5.2, 280/5.3, 659, 47.131, 47.17, 47.18, 47.24, 280/47.27, 47.28, 47.29
See application file for complete search history.

(56) References Cited

U.S. PATENT DOCUMENTS

| | | | | |
|---|---|---|---|---|
| 2,653,679 | A * | 9/1953 | Hamilton, Jr. | 187/224 |
| 3,055,523 | A * | 9/1962 | Wurn | 414/498 |
| 3,896,904 | A * | 7/1975 | Walker | 187/231 |
| 3,907,138 | A   | 9/1975 | Rhodes | |
| 3,968,974 | A * | 7/1976 | Wetzel | 280/47.27 |
| 3,993,166 | A * | 11/1976 | Senour | 187/223 |

(Continued)

FOREIGN PATENT DOCUMENTS

AU 200185504 5/2003

(Continued)

OTHER PUBLICATIONS

International Search Report; PCT/AU2005/000028; Mar. 18, 2005.

(Continued)

*Primary Examiner*—S. Joseph Morano
*Assistant Examiner*—John D Walters
(74) *Attorney, Agent, or Firm*—Cantor Colburn LLP

(57) ABSTRACT

A hand truck (20) for transporting a load is disclosed. The hand truck (20) comprises a sub-frame (22) with a foot portion (47) extending therefrom so that the sub-frame is able to support the load, a main frame (21) engaged with the sub-frame (22) such that the sub-frame (22) is able to be extended and retracted with respect to a lower end (32) of the main frame (21), at least one wheel (62, 63) secured relative to the main frame (21) so that the truck 20 is able to be wheeled about, a motor (70), a controller (74) coupled to the motor (70) for enabling a user to control the operation of the motor (70), and a flexible linkage (77) coupling the motor (70), main frame (21) and sub-frame (22) together such that the motor (70) is operable to move the linkage (77) to thereby extend or retract the sub-frame (22).

20 Claims, 13 Drawing Sheets

U.S. PATENT DOCUMENTS

| | | |
|---|---|---|
| 4,034,878 A | 7/1977 | Fox |
| 4,049,083 A | 9/1977 | Garvey |
| 4,737,065 A | 4/1988 | Ju |
| 5,372,470 A | 12/1994 | Wilke et al. |
| 5,707,200 A | 1/1998 | Liu |
| 6,398,477 B1 | 6/2002 | Fox |
| 6,457,727 B1 * | 10/2002 | Tolly ........................ 280/47.28 |
| 7,002,083 B2 * | 2/2006 | Simons ....................... 177/130 |
| 7,137,464 B2 * | 11/2006 | Stahler, Sr. ................... 180/8.2 |

FOREIGN PATENT DOCUMENTS

| | | | |
|---|---|---|---|
| BE | 1012085 | A6 | 4/2000 |
| DE | 19737960 | A1 | 3/1999 |
| FR | 2496-034 | | 6/1982 |
| FR | 2496034 | A | 6/1982 |
| FR | 2648099 | A | 12/1990 |
| NL | 1013932 | | 1/2000 |

OTHER PUBLICATIONS

EPSearchReport, EP 05 70 0060, dated Aug. 4, 2009.
New Zealand Search Report re Patent Application No. 549067, dated Aug. 20, 2009.

* cited by examiner

HAND TRUCK

FIELD OF THE INVENTION

The present invention relates generally to hand trucks and, in particular, to hand trucks that are adapted to both raise and lower a load.

Although the invention will be described with reference to particular hand trucks, it will be appreciated that this is by way of example only and that the invention may be incorporated into other hand trucks.

BRIEF DISCUSSION OF THE PRIOR ART

Hand trucks are often used in material handling applications to transport loads relatively short distances. A typical hand truck includes an upstanding elongate frame having a pair of handles at an upper end thereof and a foot portion in the form of a plate extending perpendicularly from a lower end of the frame. Two rotatable wheels are mounted on the frame adjacent to the foot portion so that a user can wheel the truck around while a load is supported on the truck by the frame such that the load rests on the foot portion of the frame.

Electrically powered hand trucks have been developed which are able to lower or raise a load. Some examples of hand trucks of this type are disclosed by U.S. Pat. Nos. 3,907,138, 4,034,878, and 6,398,477. The hand trucks disclosed by these patents have telescoping main and sub-frames. The main frame has a pair of rotatable wheels mounted adjacent a lower end thereof and a handle located adjacent its upper end. The sub-frame, which has a foot portion extending perpendicularly from a lower end thereof, is able to be extended and retracted relative to the lower end of the main frame such that the foot portion, which normally is positioned generally level with the wheels, can be lowered to a position below the wheels and then returned to its normal position. This is accomplished by suitably rotating a screw shaft which is mounted on the main frame and which engages a bearing nut fixed to the movable sub-frame. The screw shaft is rotated by an electric motor which is powered by a battery power source. Both the electric motor and the battery power source are carried by the hand truck. Electrical switching means is provided to allow a user to select the direction of rotation of the screw shaft for extending or retracting the sub-frame.

The hand trucks of the '138 and '878 patents are unable to lift a load in a similar manner to a forklift which is able to elevate a load above a surface while a body of the forklift rests on the surface.

In contrast to the hand trucks of the '138 and '878 patents the hand truck disclosed by the '477 patent is able to lift a load in a similar manner to a forklift. This is achieved by providing the hand truck with a pair of load arms which are pivotally joined to the lower end of the truck's main frame. The load arms may be stowed by pivoting them relative to the main frame so that they are generally parallel with the sides of the main frame. Alternatively, the load arms may be pivoted relative to the main frame so that they extend perpendicularly from the lower end of the main frame and are adjacent to and generally level with the hand truck's foot portion. To elevate a load above the surface on which the truck rests, the hand truck is arranged in an upright position so that the foot portion is adjacent the surface. The load arms are then pivoted relative to the main frame so that they extend perpendicularly therefrom and are adjacent to the foot portion. After the load has been placed on the load arms the electrical switching means is operated so that the sub-frame is extended from the lower end of the main frame. Movement of the sub-frame relative to the surface ceases once the sub-frame contacts the surface, thereafter further extension of the sub-frame from the main frame results in the main frame being elevated above the surface. Since the load arms are attached to the main frame and the load is supported by the load arms, the elevation of the main frame results in the load arms and the load being elevated as well.

Although the hand truck disclosed by the '477 patent is able to elevate a load in a similar manner to a forklift, the need to ensure that the load arms are properly positioned before either lowering or raising the load adds an extra level of complexity to the operation of the hand truck. Moreover, because the wheels of the hand truck are raised with the main frame when the hand truck is operated to elevate a load in a forklift-like manner, it is not possible to wheel the hand truck around while the load is raised and the wheels are not touching the ground.

U.S. Pat. No. 4,049,083 discloses a hand truck which addresses the aforementioned deficiencies of the hand truck disclosed by the '477 patent. In particular, the '083 patent discloses a stacker that is able to be attached to the hand truck disclosed by the '138 patent which was discussed previously. The stacker has a long stationary frame and a short inner frame that is able to move along the stationary frame. A pair of lifting legs extends perpendicularly from a lower end of the inner frame such that the lifting legs are able to support a load in a similar manner to the foot portion of the hand truck. The stacker also has an elongate screw shaft which freely rotates in a journal at the top of the stationary frame, but which is operatively joined to a bearing nut fixed to a top wall of the inner movable frame. The screw shaft is operatively engaged to an electric motor of the stacker which is powered by the battery carried by the hand truck. The inner frame is moved along the stationary frame to either lower or raise the lifting legs by operating the electric motor to rotate the screw shaft in the appropriate direction.

The stacker attachment disclosed by the '083 patent is able to extend the versatility of an electrically powered, hand truck such as the one disclosed by the '138 patent so that the hand truck is able to both lift and lower a load relative to a normal position of the hand truck's foot portion with respect to the hand truck's main frame. Also, the stacker attachment overcomes the previously mentioned deficiencies of the hand truck disclosed by the '477 patent by doing away with the load arms which add to the complexity of operating that particular hand truck and also allowing the hand truck to be wheeled about even when it has been operated to raise a load in a similar manner to a forklift. However, since the stacker is an attachment and is not an integral part of the electrically powered hand truck to which it may be attached, the stacker and the hand truck, whilst being attached to each other, must nevertheless be operated as separate machines as no integrated control system is provided for operating both the hand truck and the stacker. Moreover, attaching the stacker to the hand truck would likely add considerably to the weight of the hand truck in which case the manoeuvrability of the hand truck would be impaired.

It is an object of the present invention to provide a hand truck which overcomes, or at least ameliorates, one or more of the deficiencies of the prior art mentioned above, or which provides the consumer with a useful or commercial choice.

Other objects and advantages of the present invention will become apparent from the following description, taken in connection with the accompanying illustrations, wherein, by way of illustration and example, a preferred embodiment of the present invention is disclosed.

SUMMARY OF THE INVENTION

According to an aspect of the present invention there is provided a hand truck for transporting a load, the hand truck comprising a sub-frame with a foot portion extending therefrom so that the sub-frame is able to support the load, a main frame engaged with the sub-frame such that the sub-frame is able to be extended and retracted with respect to a lower end of the main frame, at least one wheel secured relative to the main frame so that the truck is able to be wheeled about, a motor, a controller coupled to the motor for enabling a user to control the operation of the motor, and a flexible linkage coupling the motor, main frame and sub-frame together such that the motor is operable to move the linkage to thereby extend or retract the sub-frame.

The term "frame" as used in this specification is defined as including within its scope a frame which consists of one or more individual frame members.

The sub-frame may be of any suitable form. However, it is preferred that the sub-frame includes a pair of side rails, at least one cross member extending between the side rails, and the foot portion. In one preferred form, the side rails of the sub-frame are tubes which have a rectangular profile. In another preferred form, the side rails of the sub-frame have a U-shaped profile.

The sub-frame preferably includes at least one strap bar for the attachment of load securing straps thereto for securing the load to the sub-frame. In a preferred form, the sub-frame includes a plurality of parallel and laterally spaced strap bars which are secured relative to side rails of the sub-frame.

In a preferred form, the sub-frame includes an extension that is able to be selectively extended relative to the lower end of the sub-frame to thereby increase the length of the sub-frame. The extension preferably includes a pair of side rails that are received by the other side rails of the sub-frame, and a cross member extending between the side rails of the extension. The side rails of the extension are preferably slideably received by the other side rails of the sub-frame. The extension is preferably secured relative to the rest of the sub-frame by at least one pin which secures the side rails of the extension relative to the other side rails of the sub-frame.

The foot portion of the sub-frame may be of any suitable form. However, it is preferred that the foot portion is generally in the form of a plate.

The main frame may be of any suitable form. However, it is preferred that the main frame includes a pair of side rails and at least one cross member extending between the side rails. In one preferred form, the side rails of the main frame have a U-shaped profile which defines a channel for receiving the sub-frame. In another preferred form, the side rails of the main frame have an L-shaped profile.

The main frame preferably includes a handle so that a user is able to tilt or otherwise move the hand truck while holding on to the handle. Preferably, the main frame includes a pair of handles that are laterally spaced apart from each other. Although it is preferred that the hand truck include handles, it should be appreciated that the provision of handles may not be necessary and that a user may hold on to the main frame itself for the purposes of tilting or otherwise moving the hand truck.

According to a preferred embodiment of the hand truck, the sub-frame is telescopically received by the main frame. However, in other embodiments a non-telescopic configuration could be employed instead.

Also, either the main frame or the sub-frame may consist of a single frame member rather than a plurality of frame members that are attached to each other.

In a preferred form, the hand truck includes a pair of wheels which are secured relative to the main frame such that the truck is able to be wheeled about. The wheels are preferably secured to an axle which is journaled to the main frame so that the wheels are able to rotate. The hand truck is not limited to having two wheels as more wheels or even a single wheel of sufficient width may be used to allow the truck to be wheeled about.

The hand truck may be provided with wheel brakes which can be selectively engaged by a user to inhibit rotation of the wheels.

The motor of the hand truck may be of any suitable type. In a preferred form, the motor is an electric motor which is powered by a source of electricity such as a battery or an electrical mains supply.

Although the motor may be directly coupled to the main frame and the sub-frame by the flexible linkage, it is preferred that the motor drives a gearbox which is coupled to the main frame and the sub-frame by the flexible linkage. The gearbox may be of any suitable type such as an in-line gearbox having linearly arranged input and output shafts, or a right-angle gearbox having input and output shafts which are arranged at right-angles with respect to each other.

The controller which enables a user to control the operation of the motor may be of any suitable type. For example, the controller may be in the form of a simple switch which is able to control the motor to cause the flexible linkage to move in an appropriate direction or to stop moving.

The flexible linkage may be of any type which is suitable for coupling the motor, main frame and sub-frame together such that the motor is operable to move the linkage to thereby extend or retract the sub-frame relative to a lower end of the main frame. In a preferred embodiment the flexible linkage is in the form of a roller chain. However, in other embodiments, the flexible linkage may, for example, be in the form of a cable or a belt.

It is preferred that one end of the flexible linkage is secured relative to the main frame, that another end of the linkage is secured relative to the sub-frame, that the linkage is trained around a rotatable member which is driven either directly or indirectly by the motor, and that the linkage is also trained around another rotatable member secured relative to the main frame or the sub-frame.

The end of the flexible linkage which is attached to the sub-frame may alternatively be attached to an extension of the sub-frame so that the extension is able to be automatically retracted relative to the sub-frame at the same time as the sub-frame is retracted relative to the main frame provided that the extension is not secured in position relative to the rest of the sub-frame by a pin or anything else.

In another preferred form, the flexible linkage may be configured as an endless linkage which is trained around a rotatable member which is driven either directly or indirectly by the motor, and that the linkage is also trained around another rotatable member secured relative to the main frame or the sub-frame with the main frame or the sub-frame being attached to the linkage at one or more points.

The rotatable members may be provided by any suitable rotatable members such as sprockets or pulleys. However, in a preferred form, the rotatable member which the flexible linkage is trained around and which is directly or indirectly driven by the motor is a sprocket, and the other rotatable member which the flexible linkage is trained around is preferably an idler pulley.

It is preferred that a spring is secured to the sub-frame and the flexible linkage to take up slack in the flexible linkage.

Preferably, the motor, gearbox (if present) and rotatable members are mounted on and secured relative to the main frame. However, in other embodiments the motor, gearbox and rotatable members may be mounted on and secured relative to the sub-frame. If the motor is an electric motor which is powered by a battery, the battery may be mounted on either the main or sub-frames.

The hand truck preferably includes safety switches that are operable to control the motor to prevent excessive extension or retraction of the sub-frame relative to a lower end of the main frame. In a preferred form, a safety switch is secured relative to a lower end of the main frame, and another safety switch is secured relative to an upper end of the main frame. Also, an actuator for the first switch is secured relative to the sub-frame near an upper end thereof such that if the sub-frame is extended by an excessive amount relative to the main frame, the actuator will contact the first switch and cause the first switch to operate to prevent the motor from extending the sub-frame any further. Moreover an actuator for the second switch is secured relative to the sub-frame near a lower end thereof such that if the sub-frame is retracted by an excessive amount relative to the main frame, the actuator will contact the second switch and cause the second switch to operate to prevent the motor from retracting the sub-frame any further.

Preferably, the hand truck includes a weight sensor for sensing if the weight of a load carried by the truck is excessive. In a preferred form, the weight sensor is provided by a support for a rotatable member of the hand truck around which the flexible member is trained, the support including a shaft which is secured relative to the main frame by a plurality of Belleville spring washers and a nut. If a load which is supported by the truck is excessively heavy, the spring washers will collapse under the weight which is transmitted to them by the shaft of the support such that the support will move relative to the main frame.

The weight sensor is preferably coupled to a safety switch which is operable to prevent the motor from retracting and extending the sub-frame relative to the main frame. The weight sensor is coupled to the safety switch such that if the weight sensor senses that the truck is carrying a load of excessive weight, the sensor will cause the switch to operate to prevent the motor from moving the sub-frame relative to the main frame.

To further enhance the forklift capability of the invention a pair of tines which are similar to forklift tines could be attached to the foot portion of the truck. Such a modification would enable the hand truck to transport a palletised load.

Also, to increase the stability of the truck when used in its forklift mode and to prevent the truck from falling forward, a pair of stabilising arms could be added which extend from the lower end of the main frame in the same direction as the foot portion. Castors could be attached to the underside of the stabilising arms so that the truck could be wheeled about like a trolley. The stabilising arms could be placed in a stowed position or removed when the truck is not being used in its forklift mode.

The hand truck could include a braking mechanism operable to prevent the sub-frame from inadvertently moving relative to the main frame as a result of the weight of the sub-frame itself or both the weight of the sub-frame and the truck's load being too much for the inertia of the drive mechanism to hold in a particular position relative to the main frame.

Nylon material may be located between the sub-frame and the main frame so as to reduce friction between the sub-frame and the main frame as they move relative to each other.

The controller of the hand truck may be remote from the rest of the hand truck so that the extension and retraction of the sub-frame relative to the main frame can be controlled remotely by a user. The remote controller may communicate with the motor in any suitable manner. For example, the remote controller may communicate with the motor of the hand truck by way of an electrical cable or by wireless means such as an infrared or radio link.

BRIEF DESCRIPTION OF THE ILLUSTRATIONS

In order that the invention may be more fully understood and put into practice, a preferred embodiment thereof will now be described with reference to the accompanying illustrations, in which.

DETAILED DESCRIPTION OF THE PREFERRED EMBODIMENT

Figure 1:
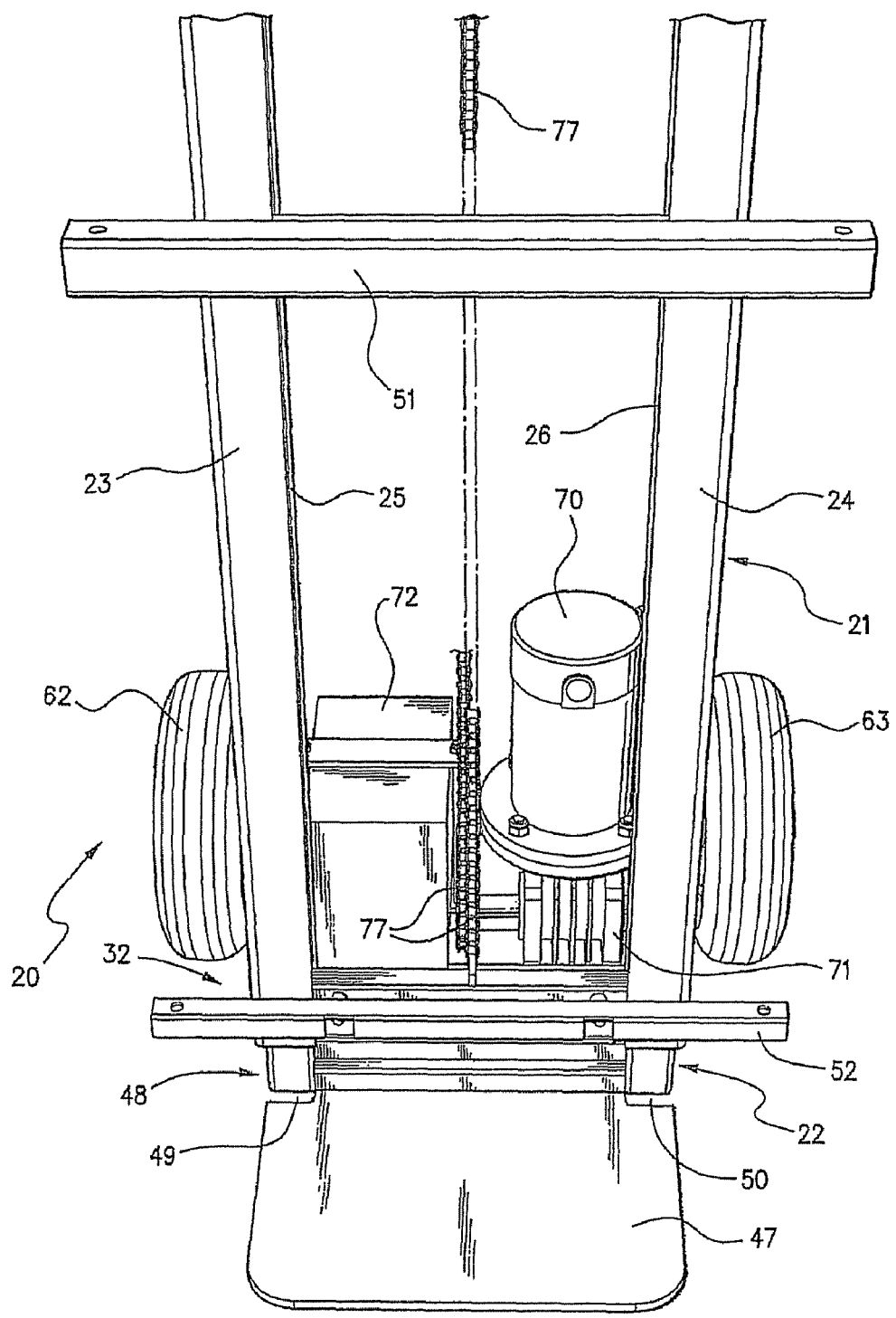
FIG. 1 is a front view of a lower portion of a hand truck according to a first preferred embodiment of the present invention.
Figure 2:
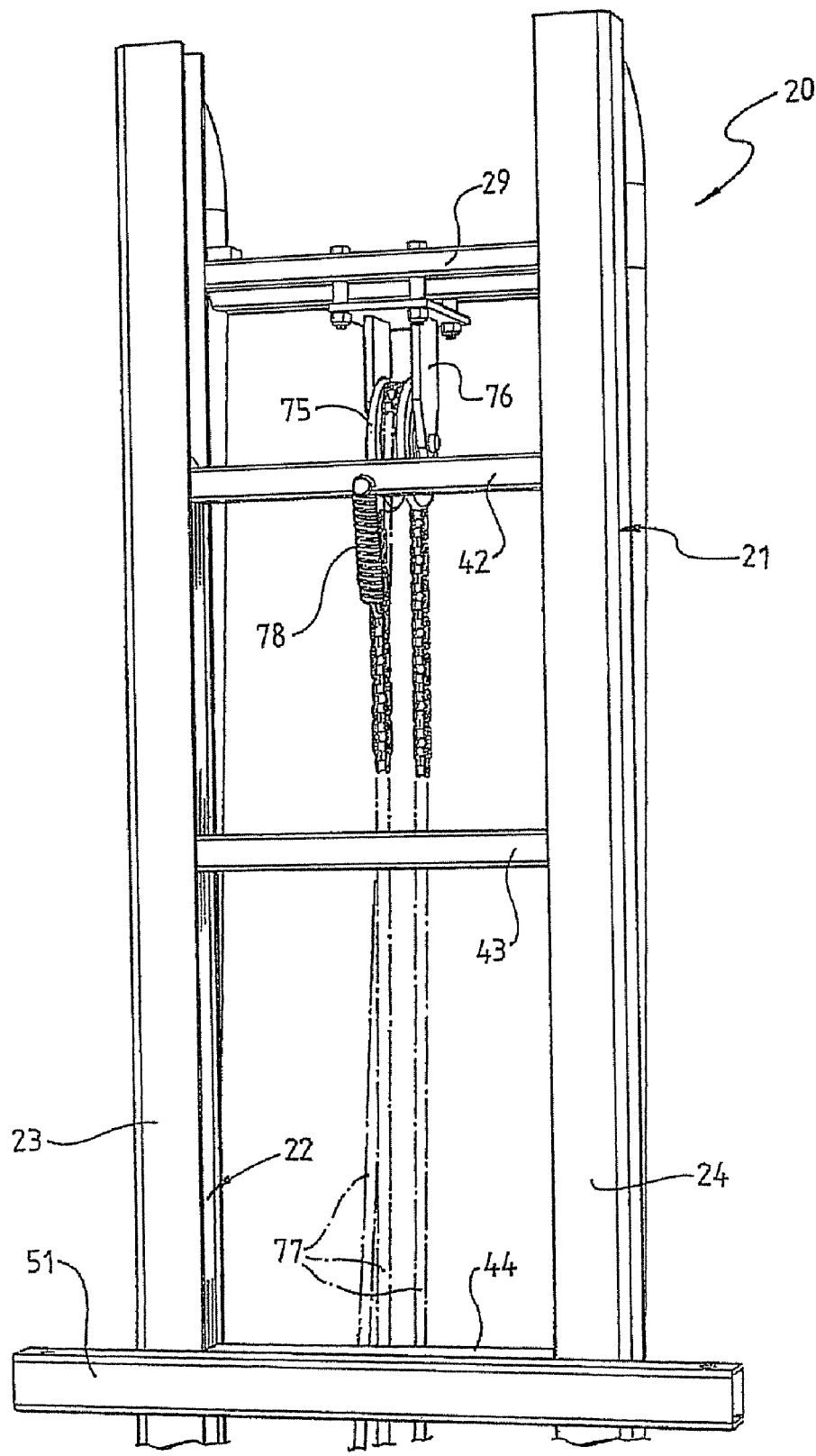
FIG. 2 is a front view of an upper portion of the hand truck illustrated in FIG. 1.
Figure 3:
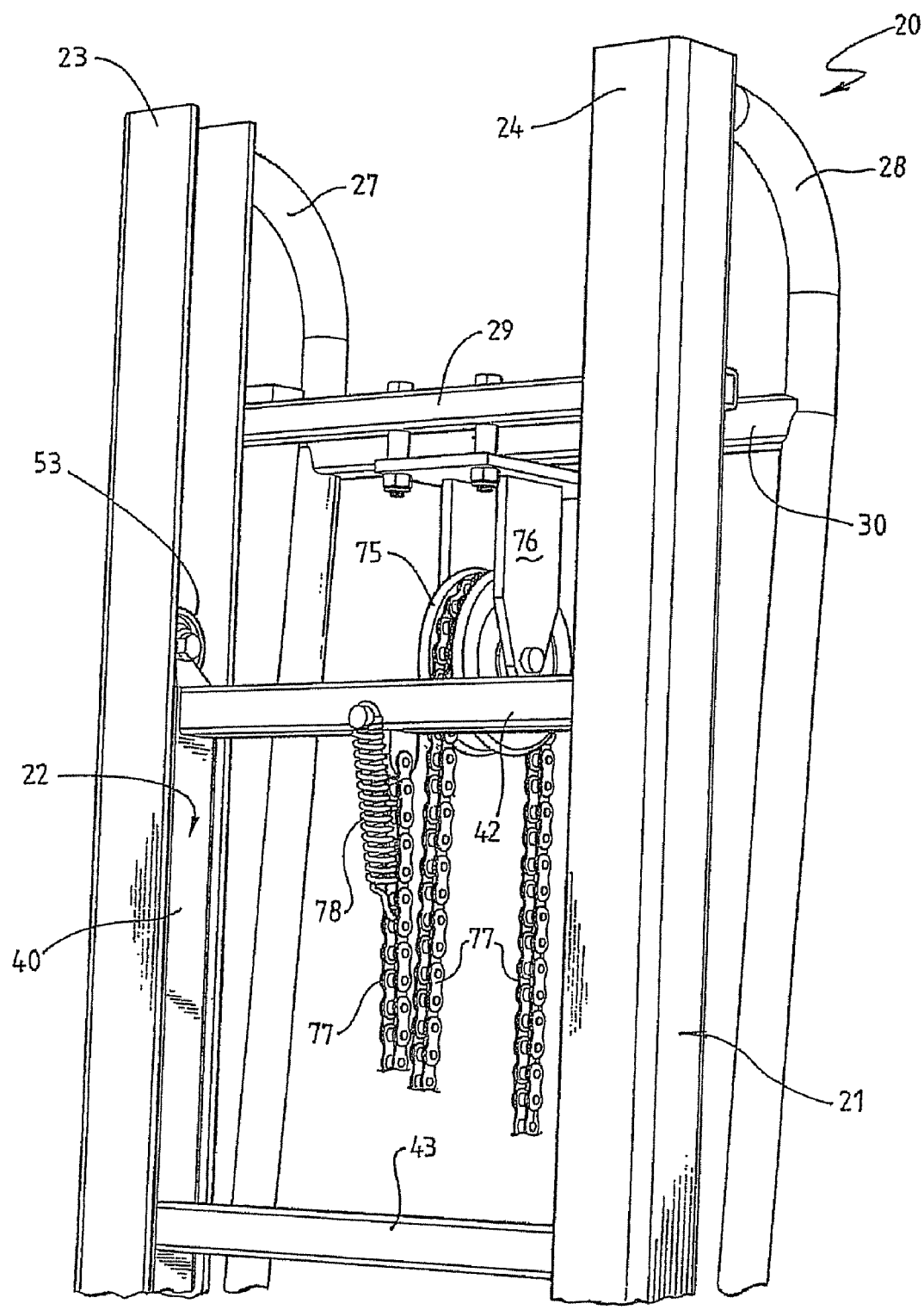
FIG. 3 is a front view of an upper portion of the hand truck illustrated in FIG. 1 which provides further details thereof.
Figure 4:
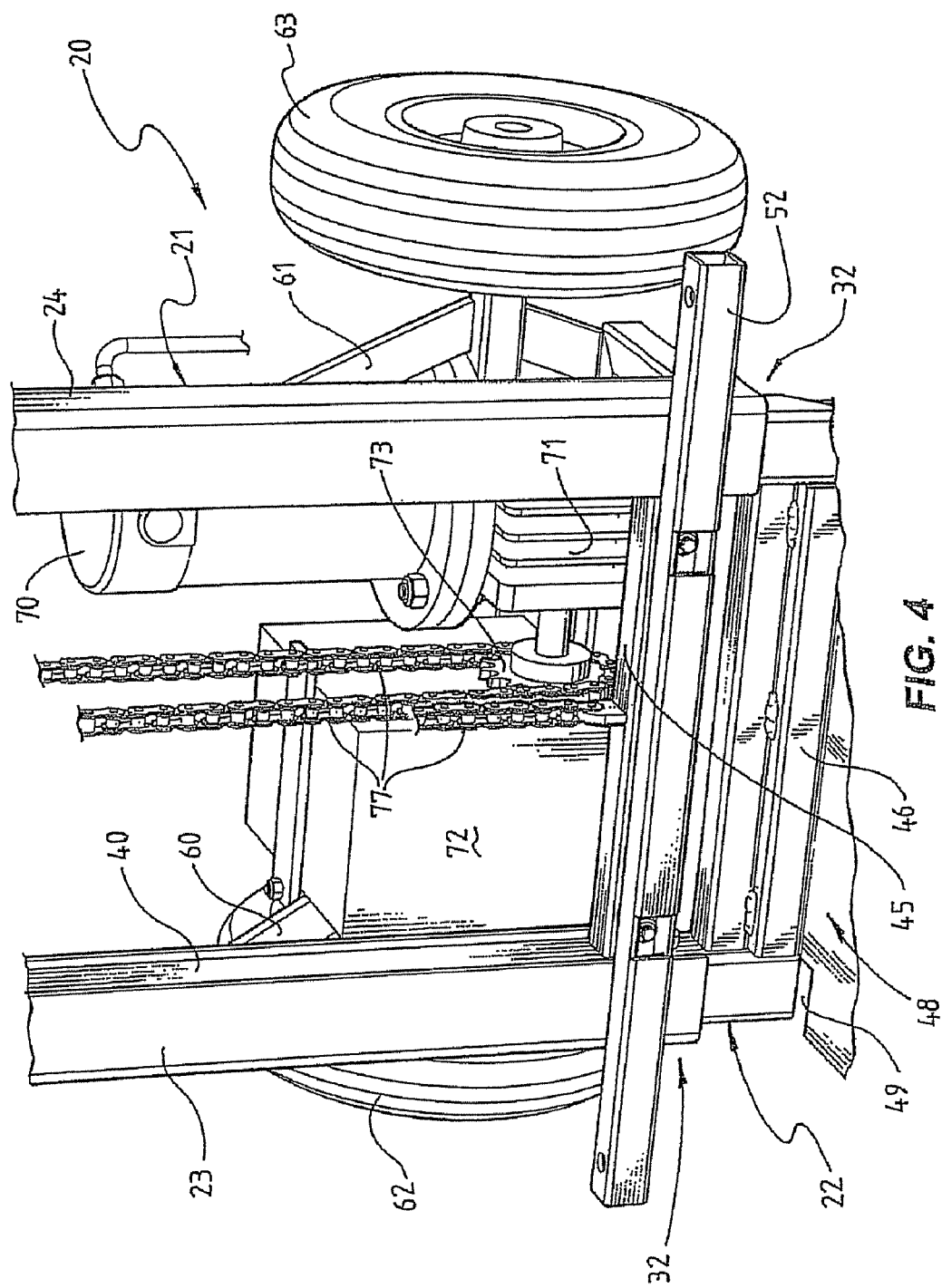
FIG. 4 is a front view of a lower portion of the hand truck illustrated in FIG. 1 which provides further details thereof.
Figure 5:
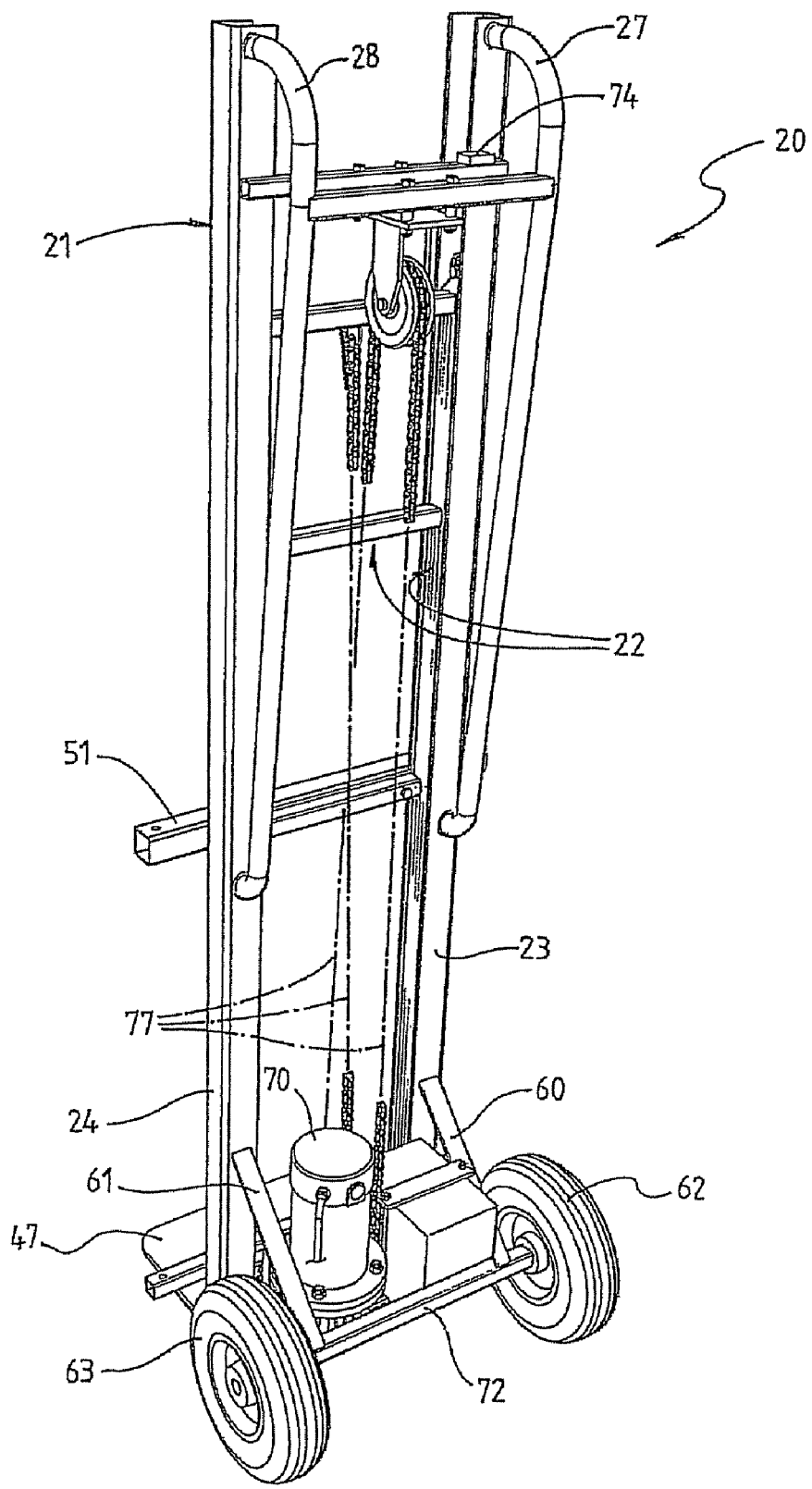
FIG. 5 is a rear view of the hand truck illustrated in FIG. 1.
Figure 6:
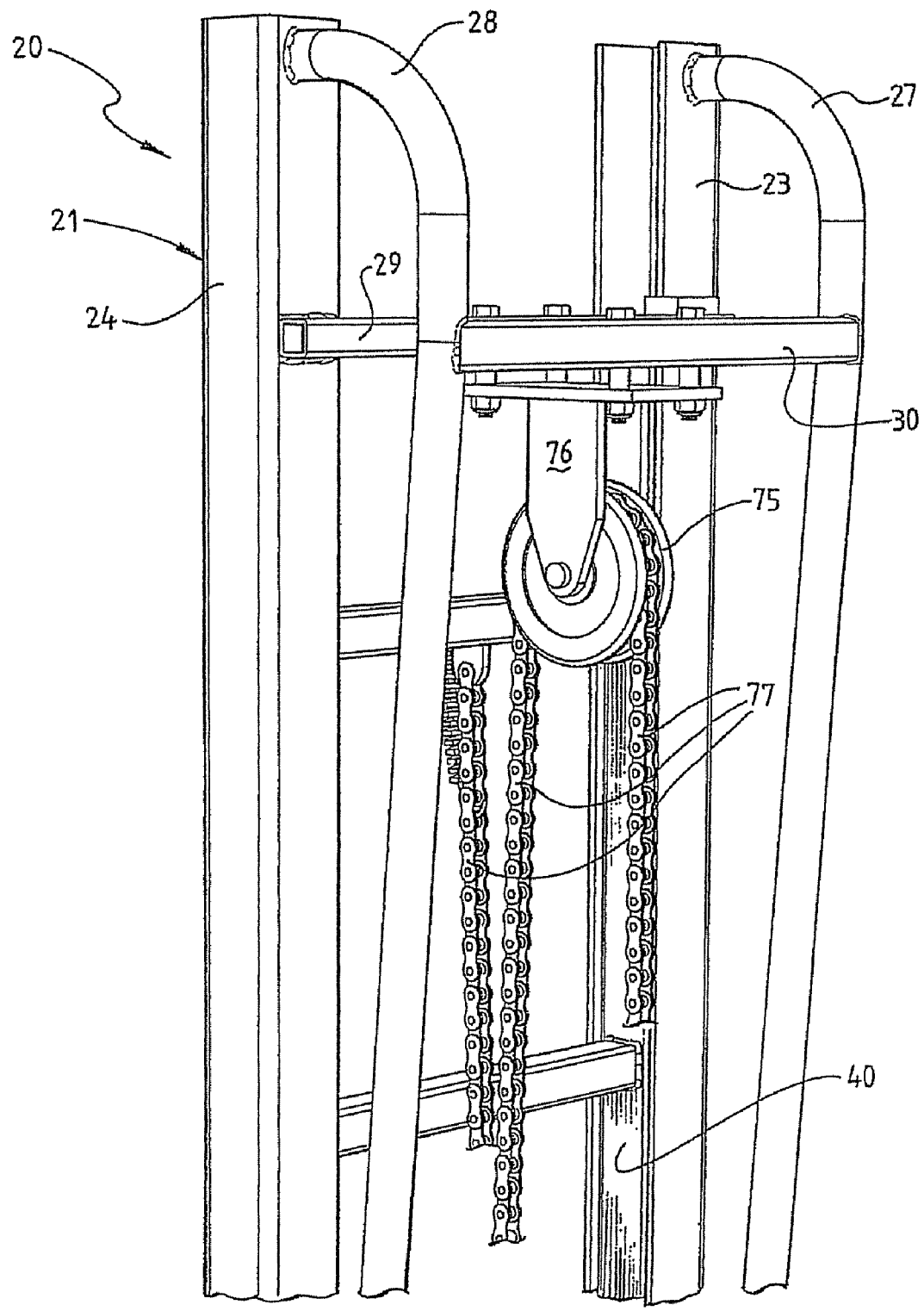
FIG. 6 is a rear view of an upper portion of the hand truck illustrated in FIG. 1.
Figure 7:
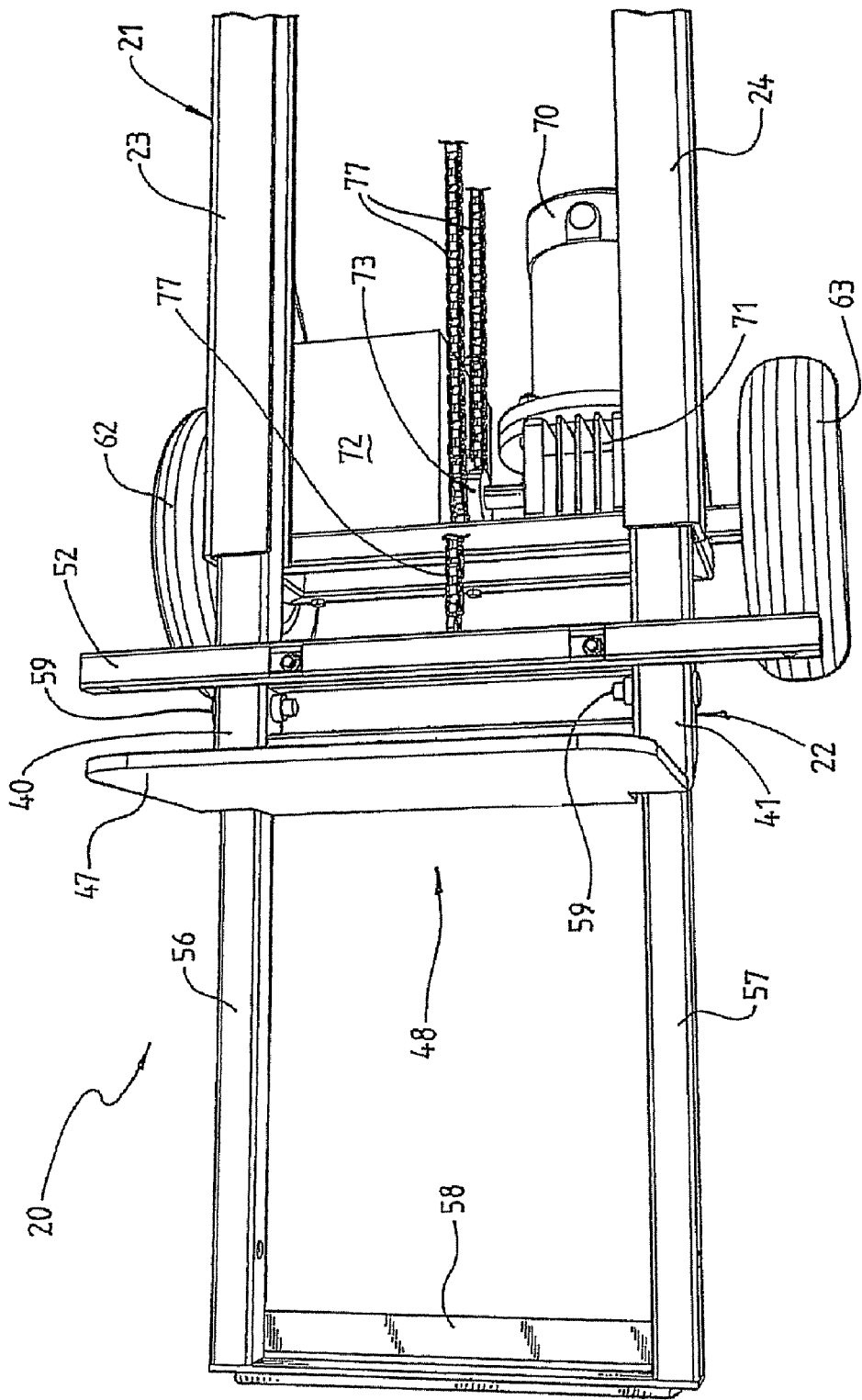
FIG. 7 is a front view of the hand truck illustrated in FIG. 1 with its sub-frame extension fully extended.

Referring to FIGS. 1 to 8, a hand truck 20 according to a first preferred embodiment of the present invention includes a telescoping frame comprising a main frame 21 and a sub-frame 22 which is slideably received by the main frame 21.

The main frame 21 includes a pair of laterally separated and parallel side rails 23 and 24 which define opposing side channels 25, 26. Handles 27 and 28 are respectively attached to side rails 23 and 24. Laterally separated and parallel cross members 29 and 30 extend between the side rails 23, 24 and the handles 27, 28, respectively. A cross member 31 extends between the side rails 23, 24 and is located adjacent a lower end 32 of the main frame 21.

The sub-frame 22 includes a pair of laterally separated and parallel side rails 40, 41 which are provided by tubes of rectangular transverse cross-section and which are slightly shorter than the side rails 23, 24 of the main frame 21. Cross members 42 to 46 extend between the side rails 40, 41 and a foot portion 47 extends perpendicularly from a lower end 48 of the sub-frame 22. Gaps 49 and 50 are provided between the foot portion 47 and the side rails 40, 41 so that the foot portion 47 does not impede movement of the sub-frame 22 relative to the main frame 21. Strap bars 51 and 52 are respectively secured to cross members 44 and 45 such that the strap bars 51, 52 extend across the side rails 40, 41. The strap bars 51, 52 are laterally spaced from the cross members 44, 45 to ensure that the strap bars 51, 52 do not impede movement of the sub-frame 22 relative to the main frame 21.

An extension 55 is received by the sub-frame 22 at the lower end 48 thereof. The extension 55 includes side rails 56, 57 and a cross member 58 extending therebetween and located at a lower end of the extension 55. The side rails 56, 57 are provided by tubes which have a rectangular transverse cross-section which is slightly smaller than the cross-section of the sub-frame's side rails 40, 41 so that the side rails 56, 57 are able to slide within the side rails 40, 41. The side rails 56, 57 may be retracted inside the side rails 40, 41 to thereby retract the extension 55 relative to the sub-frame 22. Alternatively, the side rails 56, 57 may be extended from the side rails 40, 41 to thereby extend the extension 55. Pins 59 secure the extension 55 in position relative to the sub-frame 22 by being inserted into aligned apertures in the side rails 40, 41, 56, 57.

The sub-frame 22 engages with the main frame 21 such that the side rails 40 and 41 of the sub-frame 22 are respectively slideably received by the side channels 25 and 26 of the main frame 21. The provision of bearings, such as that indicated at 53 in FIG. 3, reduces friction between the side rails 40, 41 and the side channels 25, 26 and ensures the smooth movement of the sub-frame 22 relative to the main frame 21 so that the sub-frame 22 is able to be extended and retracted with respect to the lower end 32 of the main frame 21.

Brackets 60 and 61 are attached to side rails 23 and 24, respectively, and are located adjacent the lower end 32 of the main frame 21. Wheels 62 and 63 are secured to opposite ends of an axle which is journaled to the brackets 60, 61 so that the wheels are able to rotate. The wheels 62, 63 are located on opposite sides of the main frame 21 and are adjacent to the lower end 32 thereof so that the hand truck 20 may be wheeled about in the usual manner.

An electric motor 70, gearbox 71, and battery 72 are secured to the main frame 21 and are located adjacent the lower end 32 of the main frame 21 and between the wheels 62, 63. An output shaft of the motor 70 drives an input shaft of the gearbox 71 which in turn drives an output shaft of the gearbox 71 which is at a right angle to the input shafts. The output shaft of the gearbox 71 has a drive sprocket 73 fitted to an end thereof so that rotation of the output shaft causes the sprocket 73 to rotate.

The battery 72 is connected to the motor 70 and serves as the electrical power supply for the motor 70. A user is able to control the operation of the motor 70 by means of a switch 74 which is mounted on the main frame 21 and coupled to the motor 70. In particular, by using the switch 74, a user is able to control the direction of rotation of the output shaft of the motor 70 and, hence, the direction of rotation of the drive sprocket 73. Moreover, a user is able to stop the motor 70 via the switch 74 so that rotation of the drive sprocket 73 ceases.

An idler pulley 75 which is aligned with the drive sprocket 73 is secured to the main frame 21 by means of a support 76 which is bolted to the cross members 29, 30.

One end of a flexible linkage in the form of an industrial roller chain 77 is attached to the cross member 45 of the sub-frame 22 and the chain 77 is then trained around the idler pulley 75 followed by the drive sprocket 73. The free end of the chain 77 is then attached to the cross member 42 of the sub-frame 22. A coil spring 78 is attached to the cross member 42 of the sub-frame 22 and the chain 77 to take up slack in the chain 77. By coupling the motor 70, main frame 21 and sub-frame 22 together with the chain 77 in this way, rotation of the drive sprocket 73 by the motor 70 causes the chain 77 to extend or retract the sub-frame 22 relative to the lower end 32 of the main frame 21 depending upon the direction in which the drive sprocket 73 is rotated by the motor 70. Safety switches (not shown) located at the lower end 32 of the main frame 21 and at the top of the side rails 23, 24 are connected to the motor 70 and operate to automatically stop the motor 70 from operating should there be a danger of the sub-frame 22 being excessively extended or retracted relative to the main frame 21.

Figure 8:
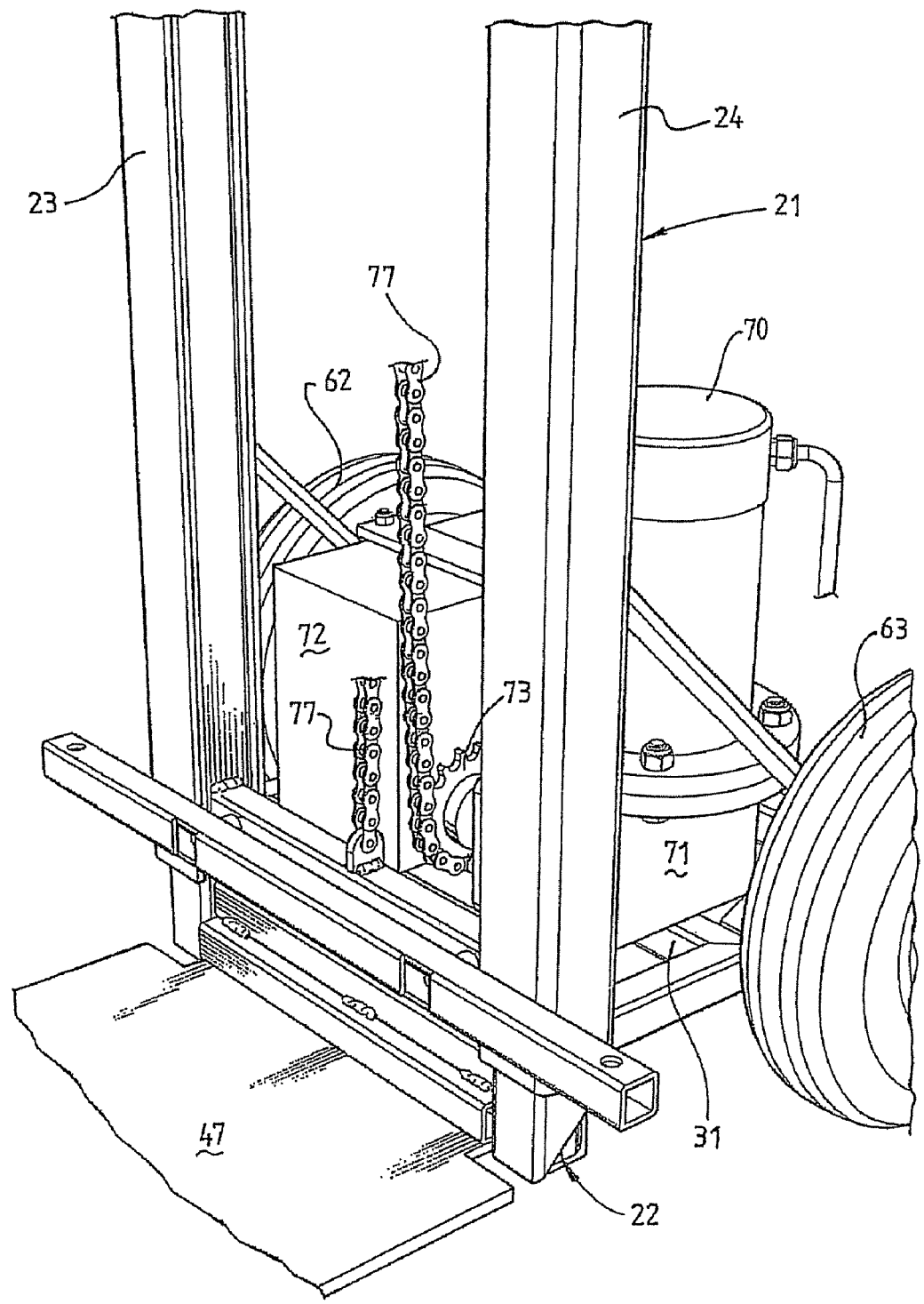
FIG. 8 is a front view of a lower portion of the hand truck illustrated in FIG. 1 with the foot portion thereof in its normal position relative to the main frame of the truck.

A user is able to control the motor 70 so that the sub-frame 22 is retracted to such an extent that the position of the foot portion 47 relative to the main frame 21 is generally level with the wheels 62, 63 (see FIG. 8). This is the normal position of the foot portion 47 relative to the main frame 21 and is usually where the foot portion 47 is positioned when the hand truck 20 is being wheeled about.

Figure 9:
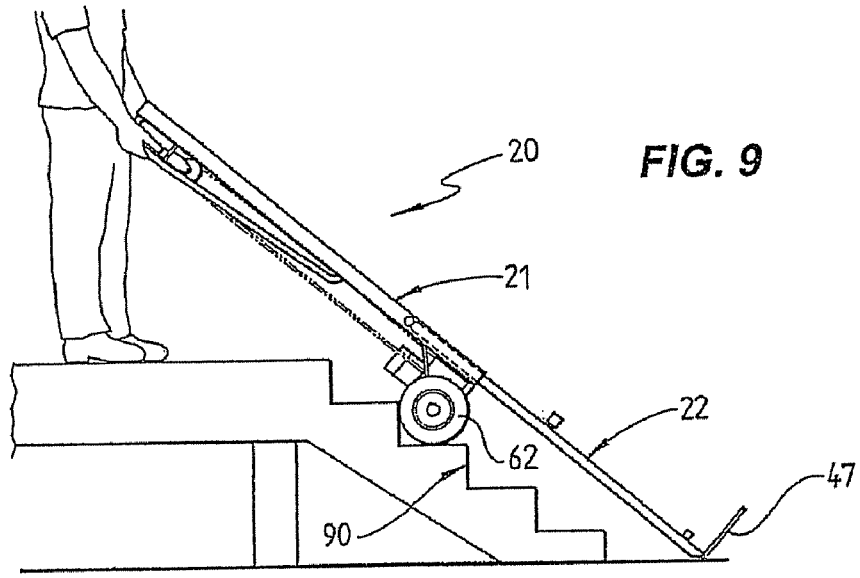
FIGS. 9-11 illustrate a method of moving a load up and down a staircase with the hand truck illustrated in FIG. 1.
Figure 10:
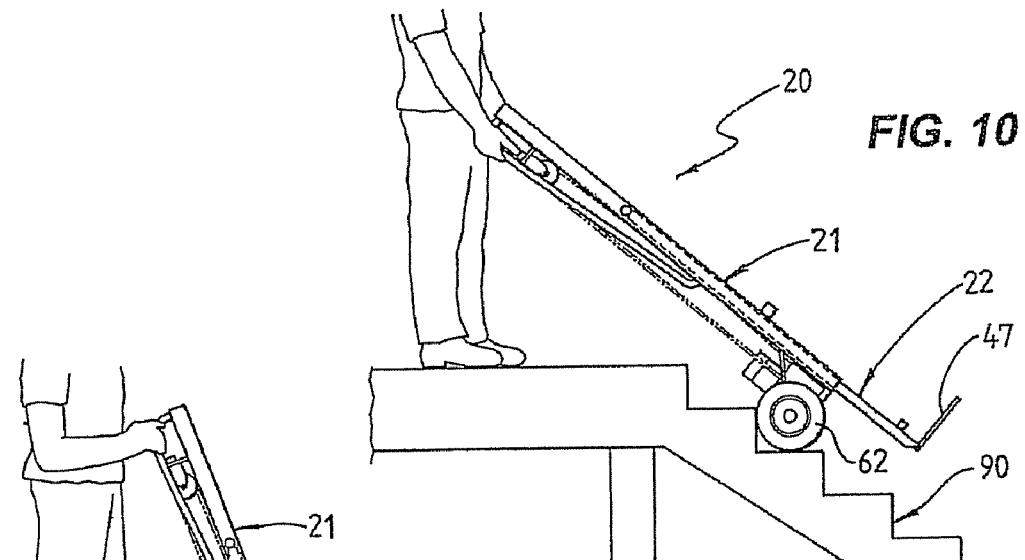
Figure 11:
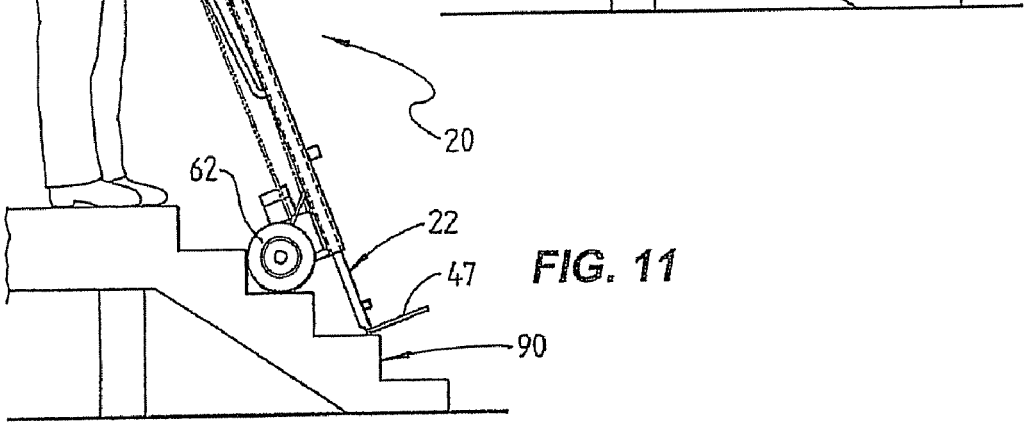

The hand truck 20 is particularly useful for carrying loads up and down a staircase without requiring as much physical exertion on the part of the user as is required to perform the same operation with other hand trucks. FIGS. 9 to 11 illustrate how the truck 20 may be used to carry a load up a staircase 90. The loaded truck 20 is initially positioned at the foot of the staircase 90 so that the wheels 62, 63 of the truck 20 can clear the front edges of the stair treads and so that the foot portion 47 can be extended away from the staircase 90. The user then operates the switch 74 so that the sub-frame 22 is extended from the main frame 21. Once the sub-frame 22 has been extended to a sufficient extent so that the foot portion 47 contacts the ground at the base of the staircase 90, further extension of the sub-frame 22 results in the main frame 21 being elevated with respect to the sub-frame 22. The main frame 21 is elevated until the truck 20 can be tilted backward so that the wheels 62, 63 are able to rest on a stair tread of the user's choosing which is elevated above the foot of the staircase 90. This is illustrated in FIG. 9 which shows the wheels 62, 63 resting on a tread and against a riser which are located above the foot of the staircase 90. After tilting the truck 20 further backward so that the foot portion 47 is lifted off the ground, the user operates the switch 74 to retract the sub-frame 22 as shown in FIG. 10. As illustrated in FIG. 11, sub-frame 22 is retracted to a sufficient extent so that the foot portion 47 can be rested on the tread of the step which is immediately below the step upon which the wheels 62, 63 rest. The truck 20 is then tilted forward slightly and the switch 74 is operated to again extend the sub-frame 22 from the main frame 21 so that the wheels 62, 63 are raised to the level of another stair tread, whereupon the truck 20 is tilted backwards so that the wheels 62, 63 engage with a higher stair tread and riser. The truck 20 is then tilted back as before and the sub-frame 22 is retracted until the foot portion 47 can be rested on the tread of the step which is immediately below the stair upon which the wheels 62, 63 rest. The procedure is repeated until the truck 20 reaches the top of the staircase 90 and the sub-frame 22 has been retracted so that the foot portion 47 is at its normal position. The reverse of the procedure is used to carry a load down the staircase 90. For very heavy loads the extension 55 of the hand truck 20 may be lowered to assist the user in tilting the truck 20 backwards.

The hand truck 20 can also be operated to lower itself and a load from an elevated platform such as the deck of a commercial vehicle. This is done by positioning the loaded truck 20 so that the foot portion 47 of the truck 20 is positioned past the edge of the deck and the wheels 62, 63 which rest on the deck are adjacent the deck edge. The switch 74 is then operated so that the sub-frame 22 is extended from the lower end 32 of the main frame 21 until the foot portion 47 contacts the surface below the deck onto which the load is being lowered. The truck 20 is then tilted forward by a sufficient amount so that the main frame 21 and wheels 62, 63 will clear the deck while being lowered to the surface below. Lowering of the main frame 21 is accomplished by operating the switch 74 to retract the sub-frame 22. Once wheels 62 and 63 contact the surface below so that the foot portion 47 is again at its normal position relative to the main frame 21, the truck 20 can be tilted backwards and wheeled away. The reverse of the procedure for lowering a load from an elevated platform is used to lift both the truck 20 and its load onto such a platform from a position below the platform. If the elevated platform is so high above the lower surface that fully extending the sub-frame 22 from the main frame 21 is not sufficient to enable the truck 20 and its load to be lowered or raised from or onto an elevated platform, then lengthening the sub-frame 22 by lowering the extension 55 may overcome this problem.

Figure 12:
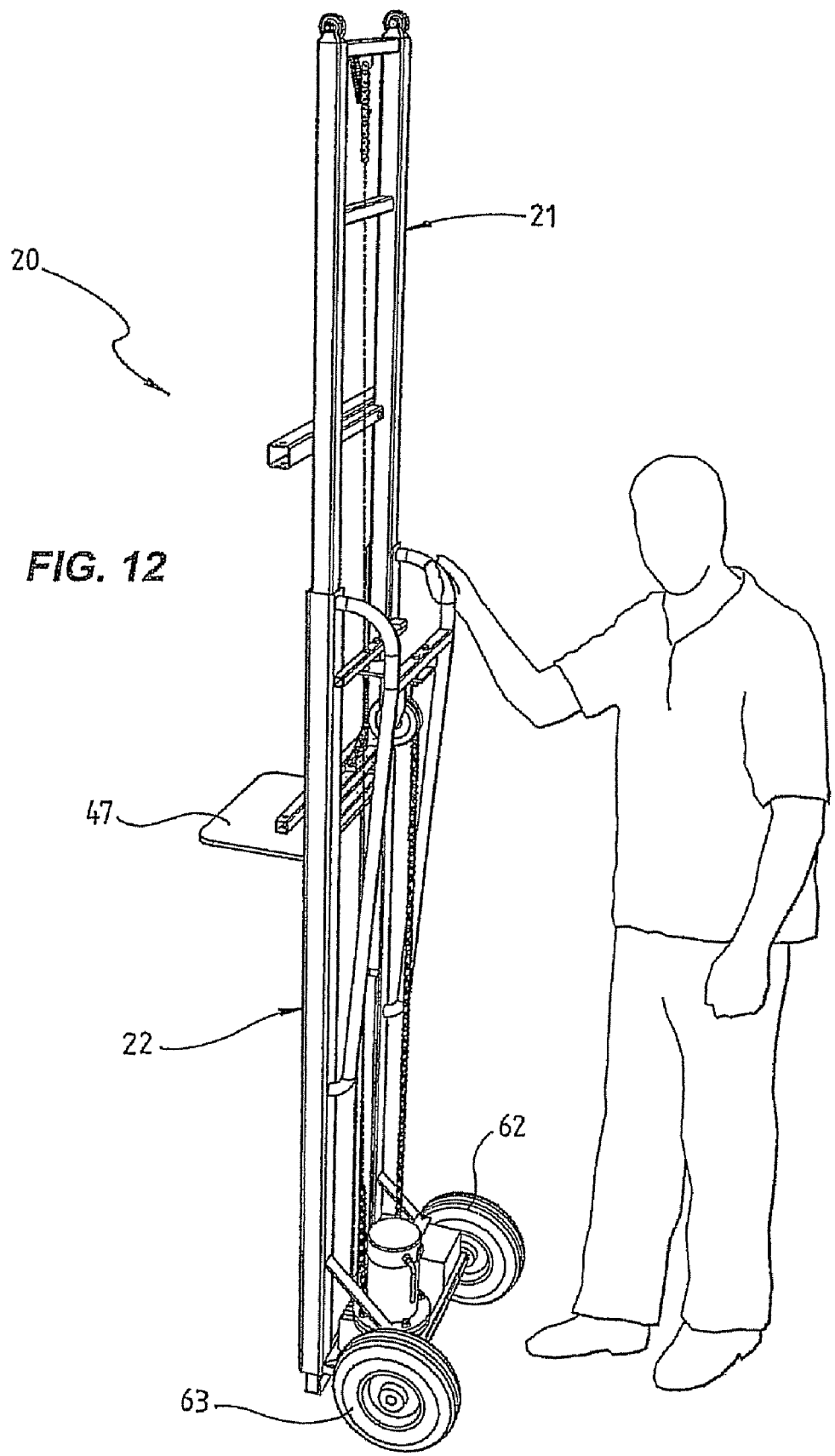
FIG. 12 is a side view of the hand truck illustrated in FIG. 1 which shows the sub-frame retracted relative to the main frame such that the foot portion of the sub-frame is elevated with respect to its normal position relative to the main frame.

The hand truck 20 is also able to lift a load in a similar manner to a forklift so that the truck can place the load on a stack or lift the load onto an elevated platform without having to resort to lifting the whole truck 20 onto the platform in the manner previously described. This capability is provided by the sub-frame 22 being able to be retracted from the lower end 32 of the main frame 21 to such an extent that the foot portion 47 is raised above its normal position relative to the main frame 21 as illustrated in FIG. 12. To lift a load in this manner, the switch 74 is simply operated to retract the sub-frame 22 to such an extent that the foot portion 47 and hence the load are raised to the necessary height. The truck 20 is then pushed forward so that the foot portion 47 and the load are directly above the position where the load is to be deposited. The switch 74 is then operated so that the foot portion 47 and the load are lowered onto the stack or elevated platform. Once the load has been lowered the foot portion 47 can be withdrawn from beneath the load by simply moving the truck 20 away from the load. The reverse of the aforementioned procedure can be used to remove a load from an elevated platform or a stack.

Figure 13:
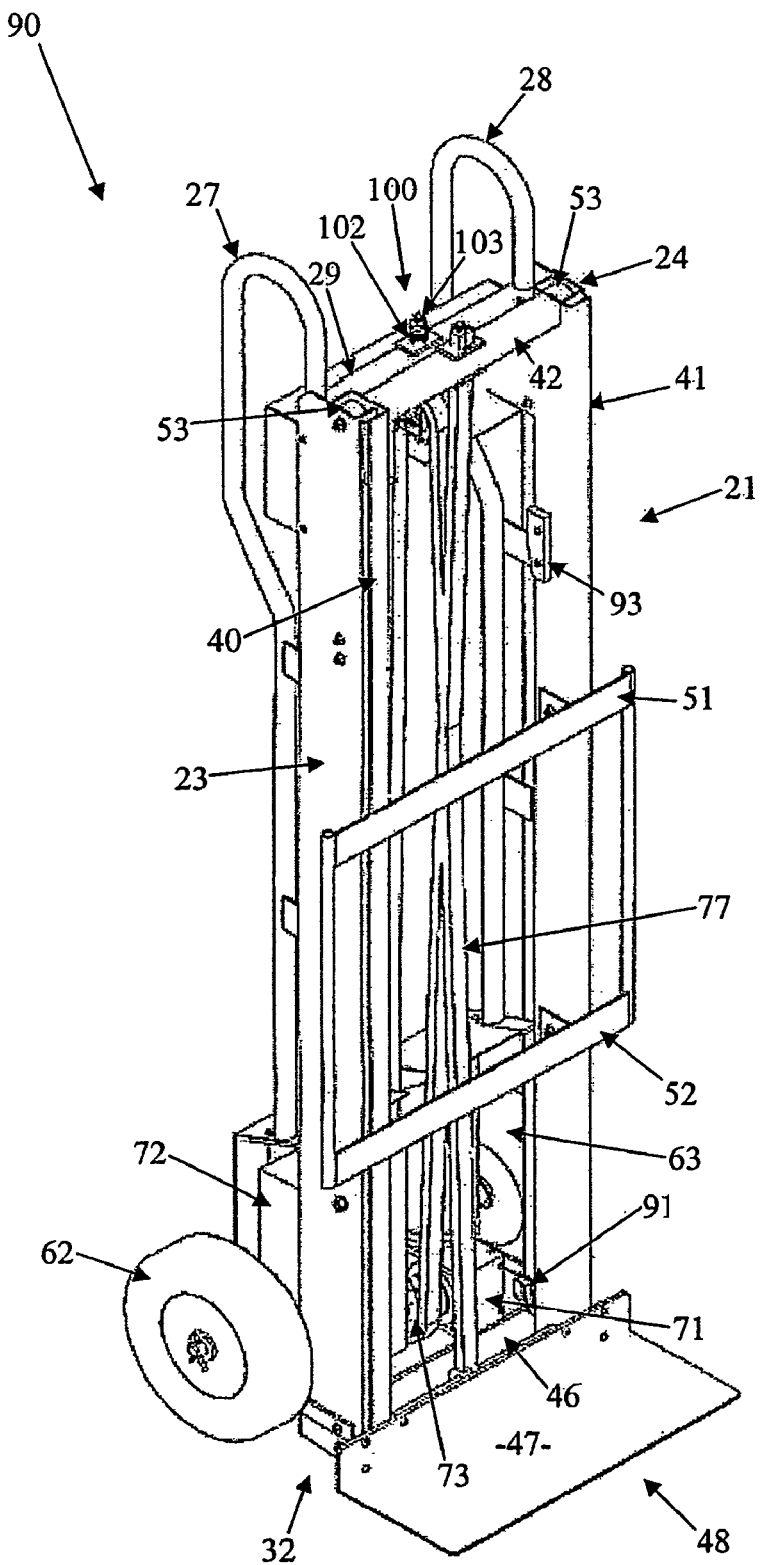
FIG. 13 is a front perspective of a hand truck according to a second preferred embodiment of the present invention.
Figure 14:
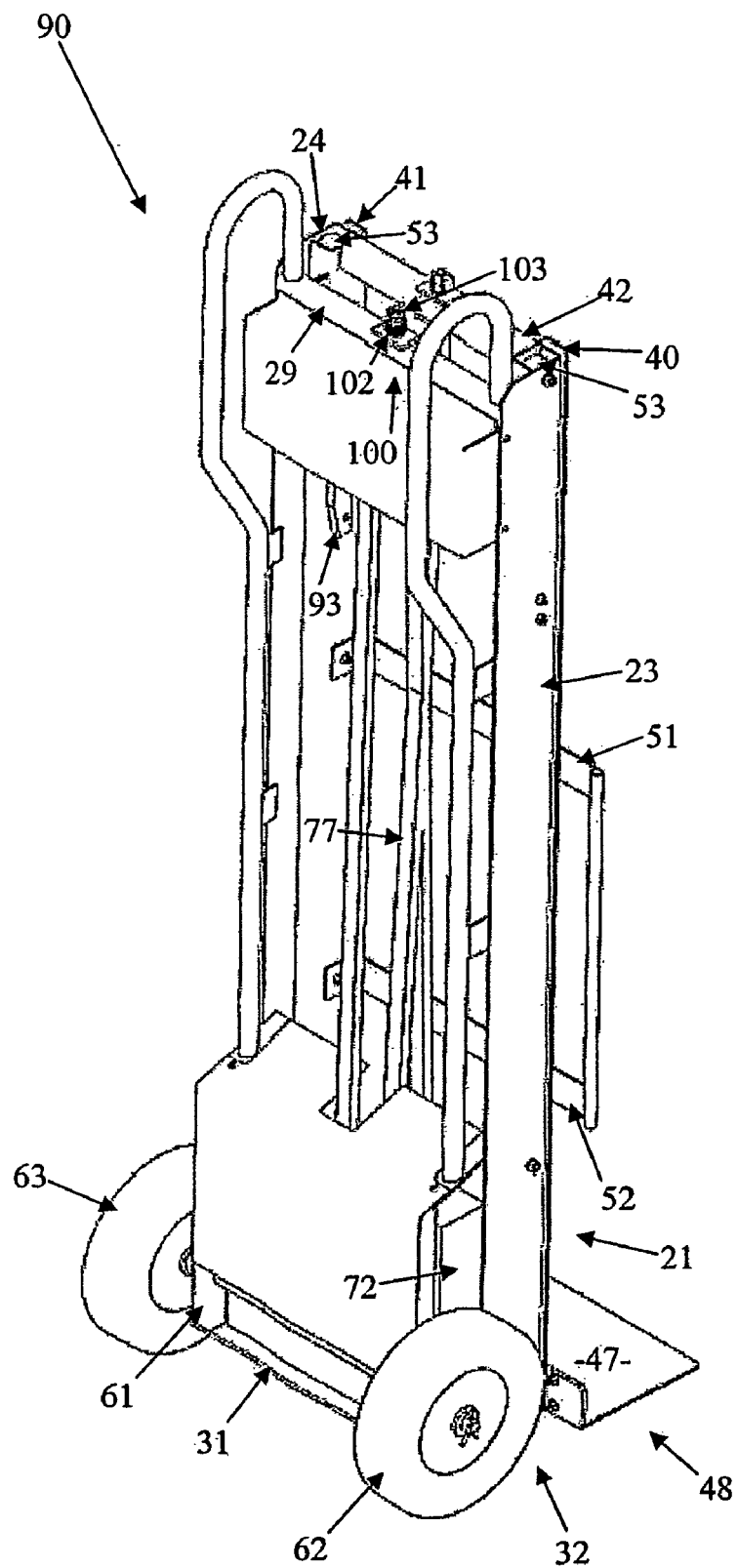
FIG. 14 is a rear perspective of the hand truck illustrated in FIG. 13.
Figure 15:
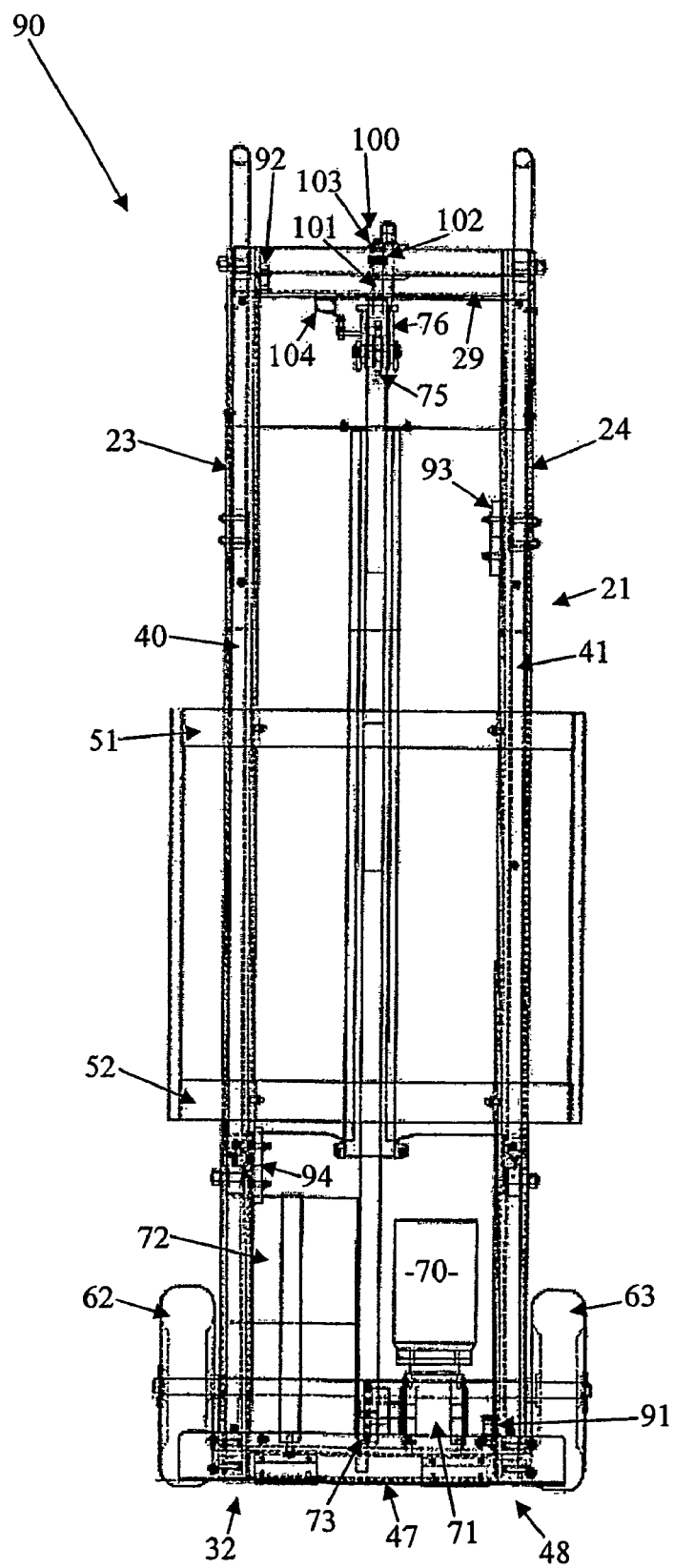
FIG. 15 is a detailed front elevation of the hand truck illustrated in FIGS. 13 and 14.

A hand truck 90 according to a second preferred embodiment of the present invention is illustrated in FIGS. 13 to 15 of the illustrations. For convenience, features of the hand truck 90 which are the same as or similar to features of the hand truck 20 are referenced with the same reference numbers.

The construction and operation of the hand truck 90 is similar to that of the hand truck 20.

The side rails 23, 24 of the hand truck 90 have an L-shaped profile, while the side rails 40, 41 of the hand truck 90 have a U-shape profile.

Hand truck 90 also includes a safety switch 91 secured relative to a lower end of the side rail 24, and a safety switch 92 secured relative to an upper end of the side rail 23. Switch 91 and switch 92 are coupled to the motor 70 so that they are able to be operated to prevent the motor 70 from retracting or extending the sub-frame 22 relative to the main frame 21. A switch actuator 93 is secured to the side rail 41 near an upper end thereof, and a switch actuator 94 is secured to the side rail 40 near a lower end thereof. If the sub-frame 22 is extended by an excessive amount relative to the main frame 21, the switch actuator 93 will contact the switch 91 so that the switch operates 91 to prevent the motor 70 from extending the sub-frame 22 any further. If the sub-frame 22 is retracted by an excessive amount relative to the main frame 21, the switch actuator 94 will contact the switch 92 so that the switch 92 operates to prevent the motor 70 from retracting the sub-frame 22 any further.

Hand truck 90 includes a weight sensor 100 for sensing if the weight of a load carried by the truck 90 is excessive. The weight sensor 100 is provided by the support 76 which includes a shaft 101 which is secured relative to cross member 29 by a plurality of Belleville spring washers 102 and a nut 103. If a load which is supported by the truck 90 is excessively heavy, the spring washers 102 will collapse under the weight which is transmitted to them by the shaft 101 of the support 76 such that the support 76 will move downwardly relative to the cross member 29.

A safety switch 104 is coupled to the motor 70 and is operable to prevent the motor 70 from retracting and extending the sub-frame 22 relative to the main frame 21. Safety switch 104 is also coupled to the support 76 so that if the sensor 100 senses that the truck 90 is carrying a load of excessive weight, the movement of the support 76 relative to the cross member 29 will cause the switch 104 to operate to prevent the motor 70 from moving the sub-frame 22 relative to the main frame 21.

Throughout the specification and the claims, unless the context requires otherwise, the term "comprise", or variations such as "comprises" or "comprising", will be understood to apply the inclusion of the stated integer or group of integers but not the exclusion of any other integer or group of integers.

Throughout the specification and claims, unless the context requires otherwise, the term "substantially" or "about" will be understood to not be limited to the value for the range qualified by the terms.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

The invention claimed is:

1. A hand truck for transporting a load, the hand truck comprising a sub-frame with a foot portion extending therefrom so that the sub-frame is able to support the load, a main frame engaged with the sub-frame such that the sub-frame is able to be extended and retracted with respect to a lower end of the main frame, at least one wheel secured relative to the main frame so that the truck is able to be wheeled about, a motor, a controller coupled to the motor for enabling a user to control the operation of the motor, and a flexible linkage coupling the motor, relative to the sub-frame such that the motor is operable to move the linkage to thereby extend and retract the sub-frame so that the foot portion is configured for both a lowering and an elevating relative to said wheel, wherein one end of the flexible linkage is directly connected to the sub-frame, and another end of the linkage is also directly connected to the sub-frame.

2. The hand truck of claim 1, wherein the sub-frame includes a pair of side rails and at least one cross member extending between the side rails.

3. The hand truck of claim 1, wherein the sub-frame includes an extension which is selectively extendable relative to the rest of the sub-frame to thereby lengthen the sub-frame.

4. The hand truck of claim 1, wherein the main frame includes a pair of side rails and at least one cross member extending between the side rails.

5. The hand truck of claim 1, wherein the main frame includes a handle.

6. The hand truck of claim 1, wherein the sub-frame is telescopically received by the main frame.

7. The hand truck of claim 1 further comprising selectively engagable wheel brakes for inhibiting rotation of the wheels.

8. The hand truck of claim 1, wherein the motor is an electric motor.

9. The hand truck of claim 1 wherein the motor includes a gearbox.

10. The hand truck of claim 1, wherein the controller is a switch.

11. The hand truck of claim 1, wherein the flexible linkage is a roller chain.

12. The hand truck of claim 1, wherein the flexible linkage is trained around a rotatable member which is driven either directly or indirectly by the motor, and is also trained around another rotatable member secured relative to the main frame.

13. The hand truck of claim 12, wherein each rotatable member is a sprocket or an idler pulley.

14. The hand truck of claim 1 further comprising a spring which is secured to the sub-frame and the flexible linkage so as to take up slack in the flexible linkage.

15. The hand truck of claim 1 further comprising safety switches that are operable to control the motor to prevent excessive extension or retraction of the sub-frame.

16. The hand truck of claim 1 further including a weight sensor for sensing if the weight of the load carried by the truck is excessive.

17. The hand truck of claim 16 further including a safety switch operable by the weight sensor to prevent the motor from retracting and extending the sub-frame if the weight sensor senses that the weight of the load is excessive.

18. The hand truck of claim 1, wherein the sub-frame includes members with fasteners extending transverse to the flexible linkage, respective ends of the flexible linkage ends being directly connected to the fasteners.

19. The hand truck of claim 18, wherein the fasteners are centrally located along the members.

20. The hand truck of claim 18, wherein the fasteners include lugs, the lugs extending from the members in opposite directions.

* * * * *